(12) United States Patent
Zak et al.

(10) Patent No.: US 10,135,851 B2
(45) Date of Patent: Nov. 20, 2018

(54) METHOD FOR PATTERN PROCESSING

(71) Applicants: Emil Zak, Munich (DE); Biao Liang, Munich (DE)

(72) Inventors: Emil Zak, Munich (DE); Biao Liang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 105 days.

(21) Appl. No.: 15/111,132

(22) PCT Filed: Jan. 13, 2014

(86) PCT No.: PCT/EP2014/050430
§ 371 (c)(1),
(2) Date: Jul. 12, 2016

(87) PCT Pub. No.: WO2015/104060
PCT Pub. Date: Jul. 16, 2015

(65) Prior Publication Data
US 2016/0344759 A1 Nov. 24, 2016

(51) Int. Cl.
H04L 29/06 (2006.01)
G06F 17/30 (2006.01)
(Continued)

(52) U.S. Cl.
CPC .... *H04L 63/1425* (2013.01); *G06F 17/30327* (2013.01); *G06K 9/00993* (2013.01);
(Continued)

(58) Field of Classification Search
CPC ................................................. H04L 63/1425
See application file for complete search history.

(56) References Cited

U.S. PATENT DOCUMENTS 5,588,132 A * 12/1996 Cardoza .................. G06F 9/546
709/216
8,281,295 B2 * 10/2012 Chen ....................... G06F 8/433
711/147
(Continued)

FOREIGN PATENT DOCUMENTS

CN 101630323 A 1/2010
WO WO 2007120165 A2 10/2007

OTHER PUBLICATIONS

Cascarano et al., "iNFAnt: NFA Pattern Matching on GPGPU Devices," ACM SIGCOMM Computer Communication Review, vol. 40, No. 5, Association for Computing Machinery, New York, New York (Oct. 2010).
(Continued)

*Primary Examiner* — Shawnchoy Rahman
(74) *Attorney, Agent, or Firm* — Leydig, Voit & Mayer, Ltd.

(57) ABSTRACT

The invention relates to a method for pattern processing on a processor platform, the method comprising: compiling a plurality of patterns into a plurality of data structures using the first processing unit, wherein the compiling is such that at least head data parts of the plurality of data structures fit into local memories of computation units of a second processing unit; and uploading the plurality of data structures into the second processing unit such that at least the head data parts of the plurality of data structures are uploaded into the local memories of the computation units of the second processing unit and remaining data parts of the plurality of data structures not fitting into the local memories are uploaded into a global memory of the second processing unit.

18 Claims, 11 Drawing Sheets

(51) Int. Cl.
*G06K 9/00* (2006.01)
*G06K 9/72* (2006.01)
(52) U.S. Cl.
CPC .............. *G06K 9/723* (2013.01); *H04L 69/12* (2013.01); *H04L 69/22* (2013.01)

(56) References Cited

U.S. PATENT DOCUMENTS

| | | | | |
|---|---|---|---|---|
| 2009/0293048 | A1* | 11/2009 | Chen | G06F 8/433 717/151 |
| 2011/0258210 | A1* | 10/2011 | Agarwal | G06F 17/30985 707/758 |
| 2013/0036409 | A1* | 2/2013 | Auerbach | G06F 8/456 717/140 |
| 2013/0338998 | A1* | 12/2013 | Freitas | G11C 13/0004 704/9 |
| 2014/0297663 | A1* | 10/2014 | Urago | G06F 17/30699 707/754 |

OTHER PUBLICATIONS

Lin et al., "Accelerating String Matching Using Multi-threaded Algorithm on GPU," IEEE Global Telecommunications Conference, pp. 1-5, Institute of Electrical and Electronics Engineers, New York, New York (Dec. 6-10, 2010).

Lin et al., "PFAC Library: GPU-Based String Matching Algorithm," GPU Technology Conference, pp. 1-40, San Jose, California, NVIDA Corporation, Santa Clara, California (May 14-17, 2012).

Oh et al., "GPU-Friendly Parallel Genome Matching with Tiled Access and Reduced State Transition Table," International Journal of Parallel Programming, vol. 41, Issue 4, pp. 526-551, Abstract, Springer US, New York, New York (Dec. 2, 2012).

Vasiliadis et al., "Parallelization and Characterization of Pattern Matching using GPUs," IEEE International Symposium on Workload Characterization, pp. 216-225, Institute of Electrical and Electronics Engineers, New York, New York (Nov. 6-8, 2011).

Yang et al., "Head-Body Partitioned String Matching for Deep Packet Inspection with Scalable and Attack-Resilient Performance," IEEE International Symposium on Parallel & Distributed Processing, pp. 1-11, Institute of Electrical and Electronics Engineers, New York, New York (Apr. 19-23, 2010).

Sheu et al., "Hierarchical multi-pattern matching algorithm for network content inspection," Information Science, vol. 178, No. 14, pp. 2880-2898, Elsevier Inc. (Jul. 15, 2008).

Wu et al, "A Hybrid Parallel Signature Matching Model for Network Security Applications Using SIMD GPU," Appt 2009, LNCS 5737, pp. 191-204, (2009).

* cited by examiner

METHOD FOR PATTERN PROCESSING

CROSS-REFERENCE TO RELATED APPLICATIONS

This application is a National Stage of International Patent Application No. PCT/EP2014/050430 filed with the European Patent Office on Jan. 13, 2014 and entitled "Method for pattern processing" which is incorporated herein by reference in its entirety.

TECHNICAL FIELD

The present disclosure relates to a method for pattern processing and to a processor system. The disclosure further relates to a method for high-performance multi-pattern regex (regular expression) matching on CPU (central processing unit) and GPU (graphics processing unit) heterogeneous platforms.

BACKGROUND

Many network security applications in today's networks are based on deep packet inspection, checking not only the header portion but also the payload portion of a packet. Multi-pattern regex matching, in which packet payloads are matched against a large set of patterns, is an important algorithm in network security applications. Nowadays, most processor vendors are increasing the number of cores in a single chip. The trend is observed not only in multi-core processors but also in many-core processors. Since deep packet inspection is often a bottleneck in packet processing, exploiting parallelism in multi-core and many-core architecture is a key to improving overall performance. In the past few years, huge advances in technology and frequency scaling allowed the majority of computer applications to increase in performance without requiring structural changes or custom hardware acceleration. While these advances continue, their effect on modern applications is not as dramatic as other obstacles such as the memory-wall and power-wall come into play. Now, with these additional constraints, the primary method of gaining extra performance out of computing systems is to introduce additional specialized resources, thus making a computing system heterogeneous. A CPU and GPU heterogeneous platform is a very typical one of such heterogeneous computing systems.

Because of the massive parallelism and computational power, Graphics Processing Units, the typical many-cores devices, have been a viable platform for general-purpose parallel computing. Multi-pattern regex matching, which is a performance consuming algorithm, is very suitable to be offloaded from CPU to GPU.

Prior art technology is usually using DFA (Deterministic Finite Automation), mDFA (multiple DFA) or their edge compression algorithm D2FA (Delayed Input DFA) to perform multi-pattern regex matching. State compression algorithm like HFA (Haskell Finite Automata) and XFA (Extended Finite Automata) is not suitable for GPU because such algorithms have many logic branches.

FIG. 1 illustrates a multi-core and many-core processor system 100 including a CPU 110 and a GPU 120. A pattern compiler 111 on the CPU 110 includes a unit for creating and optimizing DFA 112 and a unit for DFA state encoding 113. The GPU 120 includes a global memory 121 on which a memory 123 is implemented that may exchange data with a host packet buffer 114 on the CPU 110 by DMA (direct memory access). The global memory 121 further includes a results buffer 122 where matching results 115 are accessible from the CPU 110 for output. The global memory 121 further includes a state machine memory 124 that is coupled to the unit for DFA state encoding 113 on the CPU 110. The GPU 120 further comprises a set of computing units 125a, 125b, 125c each including a DFA kernel 127 including a set of streams 126a, 126b, 126c, and 126d.

The multi-core and many-core processor system 100 can perform multi-pattern regex matching on GPU 120.

A flow diagram of a compiling process performed on the CPU 110 is illustrated in FIG. 2. The compiling process performs compiling of all regex patterns into state machine data structure 112, and encoding it to DFA state table 113. The compiling process further performs uploading of DFA state table 113 into GPU Global Memory 120, 124.

The stages of the compiling process are illustrated in FIG. 2. After starting 201 the compiling process, the multi NFA is created 202. For each pattern in pattern set 203, the pattern is compiled to NFA 204 and the NFA is linked with multi NFA 205. This is performed until the last pattern 206. Then multi NFA is compiled to NFA and optimized 207, DFA state is encoded 208 and DFA state table is uploaded to GPU global memory 209 and the compiling process is finished 210.

FIG. 3 shows the overall architecture of Gnort 300, a network intrusion detection system (NIDS). Gnort is using the GPU 320 for multi-pattern matching for Snort, a network intrusion detection system on which Gnort is founded. The CPU 310 collects packets 311, decodes 312 and preprocesses 313 them. A separate buffer is used for temporarily storing the packets of each group. After a packet has been classified 314 to a specific group 315, it is copied to the corresponding buffer 321. Whenever the buffer gets full, all packets are transferred to the GPU 320 in one operation. The GPU 320 performs multi-pattern matching and puts matches to a result buffer 326 from which the CPU 310 gets the matches 327 and then continues processing. Once the packets have been transferred to the GPU 320, the pattern matching operation is performed on a plurality of multiprocessors 325 by using packet texture 323 and state table texture 324. The algorithm iterates through all the bytes of the input stream and moves the current state to the next correct state using a state machine that has been previously constructed during initialization phase.

FIG. 4 illustrates the flow diagram for CPU side processing 400. After start 401, a packet is received from a network 402, the packet is preprocessed 403. If fast path 404 is enabled, the next packet is received from the network. If fast path 404 is not enabled, the packet is put into packet buffer 405. If the buffer is full or timeout 406, the packet buffer is transferred to GPU by using direct memory access (DMA) 407 and matches are received from GPU 408 which are used for the next process 409. If the buffer is not full or no timeout 406 happens, the next packet is received from the network.

FIG. 5 illustrates a schematic diagram 500 for GPU side processing and FIG. 6 a corresponding flow diagram 600 for GPU side processing. Input data 510 includes a number of N packets 511, 512, 513, 514. Each packet is processed by a respective thread 521, 522, 523, 524 and forwarded in an ordered sequence to the state transitions table 520. After start 601, the GPU packet buffer is checked 602. If the buffer is not empty, the kernel starts pattern matching 603 and N threads 604, 605, 606, 607 match respective packets 1 to N by using the state transitions table 520. The result is written to result buffer 608.

In order to fully utilize the massive parallelism, prior art treats each thread as a regex engine, accesses the state table in global memory and searches one packet each time.

As DFA algorithms as described above have excessive space complexity, the DFA state table is very large, threads access the GPU global memory very frequently while pattern matching, which will dramatically decrease the performance. Each thread needs to visit the whole DFA state table. The DFA state table, however, usually extends to tens or even hundreds of megabytes (MB). Therefore, the thread access to GPU global memory happens very frequently. The waiting time for a thread to terminate is long. In the network, the size of a packet can be quite different, so the workload of each thread is not equal, the first finished thread may need to wait until the last thread is finished. This will deteriorate the overall parallelism of the GPU.

SUMMARY

It is the object of the invention to provide a technique for high-performance pattern processing on a multi-core and many-core processor system.

This object is achieved by the features of the independent claims. Further implementation forms are apparent from the dependent claims, the description and the figures.

The invention as described in the following is based on the finding that the performance for pattern processing can be improved by splitting the whole DFA state machine into many small data structures. Each data structure is then small enough that the whole or the head part of the data structure can be fixed into GPU local memory. So, access to GPU Global Memory can be reduced. All threads may search against one packet each time, each thread may only access a specific data structure and may search from a specific part of the packet that is indicated by the specific data structure. All threads may only need to process a few bytes of the packet, thereby minimizing the waiting time for a thread to terminate and thus providing a better parallelism.

The disclosure describes a method of multi-pattern regex matching on CPU and GPU heterogeneous platforms that achieves high performance, small memory footprint, short compilation time and good scalability in multi-core and many-core processors.

In order to describe the invention in detail, the following terms, abbreviations and notations will be used:
CPU: Central Processing Unit.
GPU: Graphics Processing Unit.
DFA: Deterministic Finite Automation.
Regex: regular expression.
Trie: an ordered tree data structure.

Multi-core and many-core processors have become the standard building block for desktop and scalable computers. The relationship between clock rate and power consumption, coupled with a limited ability to handle dissipated heat, means that performance improvements are now coming in the form of a growing number of parallel cores instead of an increased clock rate. While multicore processors have been present in distributed-memory systems since the early 1990s, the majority of scientific applications for these systems were developed using only a distributed memory model. Codes using a distributed-memory programming model can benefit from multicore nodes treating each core as a node unto itself. In the particular case of a distributed memory code, a cluster of m nodes with k cores per node can be launched with p=m times k processes. This approach is popular, due to its simplicity and current success. When moving from moderately multicore nodes (approx. 10 cores per node) to many core nodes (tens or hundreds of cores per node) it will be necessary to exploit some level of parallelism to see continued speed-up on future processors.

A deterministic finite automaton (DFA)—also known as deterministic finite state machine—is a finite state machine that accepts/rejects finite strings of symbols and produces a unique computation (or run) of the automaton for each input string. 'Deterministic' refers to the uniqueness of the computation.

A regular expression (abbreviated regex) is a sequence of characters that forms a search pattern, mainly for use in pattern matching with strings, or string matching, i.e. "find and replace"-like operations.

A Trie, also called digital tree, radix tree or prefix tree as they can be searched by prefixes, is an ordered tree data structure that is used to store a dynamic set or associative array where the keys are usually strings. Unlike a binary search tree, no node in the tree stores the key associated with that node; instead, its position in the tree defines the key with which it is associated. All the descendants of a node have a common prefix of the string associated with that node, and the root is associated with the empty string.

According to a first aspect, the invention relates to a method for pattern processing on a processor platform or processor system, the method comprising: compiling a plurality of patterns into a plurality of data structures using the first processing unit, wherein the compiling is such that at least head data parts of the plurality of data structures fit into local memories of computation units of a second processing unit; and uploading the plurality of data structures into the second processing unit such that at least the head data parts of the plurality of data structures are uploaded into the local memories of the computation units of the second processing unit and remaining data parts of the plurality of data structures not fitting into the local memories are uploaded into a global memory of the second processing unit.

Each data structure is small enough that the whole or the head part of the data structure can be fitted into local memory of the second processing unit, e.g. local memory of a GPU. So, accesses to global memory of the second processing unit, e.g. a global GPU memory, can be reduced.

In a first possible implementation form of the method according to the first aspect, the first processing unit comprises a central processing unit (CPU) of the processor platform and the second processing unit comprises a graphics processing unit (GPU) of the processor platform.

The CPU can be a multi-core processor and the GPU can be a many core processor. Hence, the processor platform can be a multi-core and many-core processor platform on which the method can be performed. By having the possibility of performing the method on such a multi-core and many-core processor platform it can be achieved that the method can be performed even on personal computers and not only on high end data center computer, as CPUs and GPUs are typically components of personal computers.

In a second possible implementation form of the method according to the first aspect as such or according to the first implementation form of the first aspect, the compiling is performed such that the full data structures fit into the local memories of the computation units of the second processing unit, e.g. the graphics processing unit; and the uploading is performed such that the full data structures are uploaded into the local memories of the computation units of the second processing unit, e.g. the graphics processing unit.

When the full data structures fit into the local memories performance of pattern processing can be increased because accesses to local memories are faster than accesses to global memory.

In a third possible implementation form of the method according to the first aspect as such or according to one of the preceding implementation forms of the first aspect, the compiling is performed such that the head data part of each data structure fits into a local memory of a corresponding computation unit of the second processing unit; and the uploading is performed such that at least the head data part of each data structure is uploaded into the local memory of the corresponding computation unit of the second processing unit.

When the head data part of each data structure fits into a local memory of a corresponding computation unit, processing speed can be increased because each computation unit can perform pattern processing based on accesses to its own local memory which are faster than accesses to global memory or to local memory of other computation units.

In a fourth possible implementation form of the method according to the first aspect as such or according to any of the preceding implementation forms of the first aspect, the uploading is performed such that (at least each head data part of) each data structure is uploaded only into one (local memory) of the computation units of the second processing unit.

When each data structure is uploaded only into one of the computation units processing speed can be increased because no inter-processor connections have to be established.

In a fifth possible implementation form of the method according to the first aspect as such or according to any of the preceding implementation forms of the first aspect, the plurality of patterns comprise regex patterns.

Regex patterns are popular. The method thus can be employed in a multitude of applications.

In a sixth possible implementation form of the method according to the first aspect as such or according to any of the preceding implementation forms of the first aspect, the compiling is performed such that each data structure comprises a Trie data structure.

Tries can be searched by prefixes as all the descendants of a node have a common prefix of the string associated with that node. Thus, using a Trie data structure reduces computation complexity for searching a pattern.

In a seventh possible implementation form of the method according to the first aspect as such or according to any of the preceding implementation forms of the first aspect, the compiling is performed such that each data structure comprises a Deterministic Finite Automation state table.

A deterministic finite automaton (DFA) accepts/rejects finite strings of symbols and only produces a unique computation (or run) of the automaton for each input string. A DFA is one of the simplest models to capture the finite state machines. Hence, a method using DFA is simple and very efficient.

In an eighth possible implementation form of the method according to the first aspect as such or according to any of the preceding implementation forms of the first aspect, the method comprises receiving a packet in a packet buffer of the second processing unit; and executing multiple pattern matching with respect to the received packet by using a plurality of threads running on the computation units of the second processing unit, wherein each thread processes at least a portion of the received packet according to a data structure uploaded at least partially (at least the head data part of the data structure) into the local memory of the computation unit on which the thread is running.

All threads can search against one packet at any time. Each thread can access a specific data structure only and search in a specific part of the packet that can be indicated by information in the specific data structure or by the thread number itself (e.g. thread number one starts to process the data from byte number one, thread two from byte number two and so on). All threads will only need to process few bytes of the packet. Therefore the time for waiting for a thread to terminate can be minimized and parallelism can be expanded thereby improving efficiency.

In a ninth possible implementation form of the method according to the eighth implementation form of the first aspect, the information which portion of the received packet is processed by a particular thread is comprised in the data structure uploaded at least partially into the local memory of the computation unit on which the particular thread is running.

When the information which portion of the received packet is processed by a particular thread is comprised in the data structure, the processing can be flexibly adapted to different scenarios.

In a tenth possible implementation form of the method according to the eighth or the ninth implementation form of the first aspect, all of the threads running on the different computation units execute the multiple pattern matching with respect to one and the same received packet.

When all threads execute the multiple pattern matching with respect to one received packet, parallelism can be broadened and computing efficiency increased.

In an eleventh possible implementation form of the method according to any of the eighth to the tenth implementation forms of the first aspect, each data structure comprises information indicating a first byte of the received packet to be processed by a particular thread performing pattern matching according to such data structure.

All threads will only need to process the received packet starting from the byte indicated in the information of the corresponding data structure according to which the thread performs the pattern matching. As not each thread has to process the complete packet anymore, the waiting time for each thread to terminate is reduced.

In a twelfth possible implementation form of the method according to the eleventh implementation form of the first aspect, the first byte indicated in the information is different for each data structure and indicates an increasing byte of the received packet.

In a thirteenth possible implementation form of the method according to according to any of the eighth to the twelfth implementation forms of the first aspect, each data structure comprises information indicating a last byte of the received packet to be processed by a particular thread performing pattern matching according to such data structure.

Then each thread can search on different parts of the input data which allows broadening parallel processing and improving computational efficiency.

In an another possible implementation form of the method according to the first aspect as such or according to any of the preceding implementation forms of the first aspect, the second processing unit may have at least 10, 50, 500 or 1000 times more computation units than the first processing unit has.

In a further possible implementation form of the method according to the first aspect as such or according to any of the preceding implementation forms of the first aspect, a data structure which does not fit into the local memory is completely loaded into to the global memory of the second processing unit.

According to a second aspect, the invention relates to a processor platform, i.e. a processor system, comprising: a first processing unit configured to compile a plurality of patterns into a plurality of data structures; and a second processing unit comprising a global memory, a packet buffer and a plurality of computation units, each computation unit comprising a local memory, wherein the first processing unit is configured to compile the plurality of patterns such that at least head data parts of the plurality of data structures fit into the local memories of the computation units of the second processing unit; and wherein the first processing unit is configured to upload the plurality of data structures into the second processing unit such that at least the head data parts of the plurality of data structures are uploaded into the local memories of the computation units of the second processing unit and remaining data parts of the plurality of data structures not fitting into the local memories are uploaded into the global memory of the second processing unit.

Compiling the plurality of patterns into a plurality of data structures that fit into local memory improves computational efficiency as accesses to local memory are faster than access to global memory.

In a first possible implementation form of the system according to the second aspect, the first processing unit comprises a central processing unit (CPU) and the second processing unit comprises a graphics processing unit (GPU).

The CPU can be a multi-core processor and the GPU can be a many core processor. Hence, the processor platform or system can be a multi-core and many-core processor platform or system, e.g. on which the method according to the first aspect or an implementation form of the first aspect can be performed. By having the possibility of performing the method on such a multi-core and many-core processor platform it can be achieved that the method can be performed even on personal computers and not only on high end data center computer, as CPUs and GPUs are typically components of personal computers.

In a second possible implementation form of the system according to the second aspect as such or according to the first implementation form of the second aspect, the second processing unit is configured: to receive at least one packet from the first processing unit in the packet buffer; and to execute multiple pattern matching with respect to the received at least one packet by using a plurality of threads running on the computation units of the second processing unit, wherein each thread is configured to process a portion of the received at least one packet according to information comprised in the data structures uploaded into the second processing unit.

More than one packet can be uploaded at a time. This can improve an efficiency of the upload process. Each computing unit may start its processing starting from the corresponding byte of all the packets in the group.

In an another possible implementation form of the system according to the second aspect as such or according to any of the preceding implementation forms of the second aspect, the second processing unit may have at least 10, 50, 500 or 1000 times more computation units than the first processing unit has.

According to a third aspect, the invention relates to a computer program having a program code for performing the method according to the first aspect as such or according to any of the preceding implementation forms of the first aspect, when the computer program runs on a computer.

The computer program can be flexibly designed such that an update of the requirements is easy to achieve. The computer program product may run on a multi core and many core processing system.

According to a fourth aspect, the invention relates to a method that splits the whole DFA state machine into many small data structures and each thread matching against the specific part of the same packet by travelling specific data structure on CPU+GPU heterogeneous environment.

By splitting the whole DFA state machine into many small data structures local memory can be used that is faster to access than global memory.

According to a fifth aspect, the invention relates to a method to fix small data structures into GPU Local Memory, wherein a data structure that is too big to be fixed into the Local Memory is split into a head part and the left part, the head part is fixed into GPU Local Memory and the left part is put into GPU Global Memory.

Main information with respect to routing may be stored in the head part, so when storing the head part in local memory processing performance can be increased.

In a first implementation form of the fifth aspect, the head part is equal to a cache efficient part.

Cache memory can be accessed very fast.

According to a sixth aspect, the invention relates to a method for thread matching in GPU, wherein all threads search against one packet each time, each thread accesses a specific Trie only and searches from a specific part of the packet that is indicated by the Trie.

This supports a higher degree of parallelism.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The devices and methods described herein may be based on event computing nodes and event state stores. It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in data base management systems, in particular DBMS using SQL. The described devices and systems may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

Figure 1:
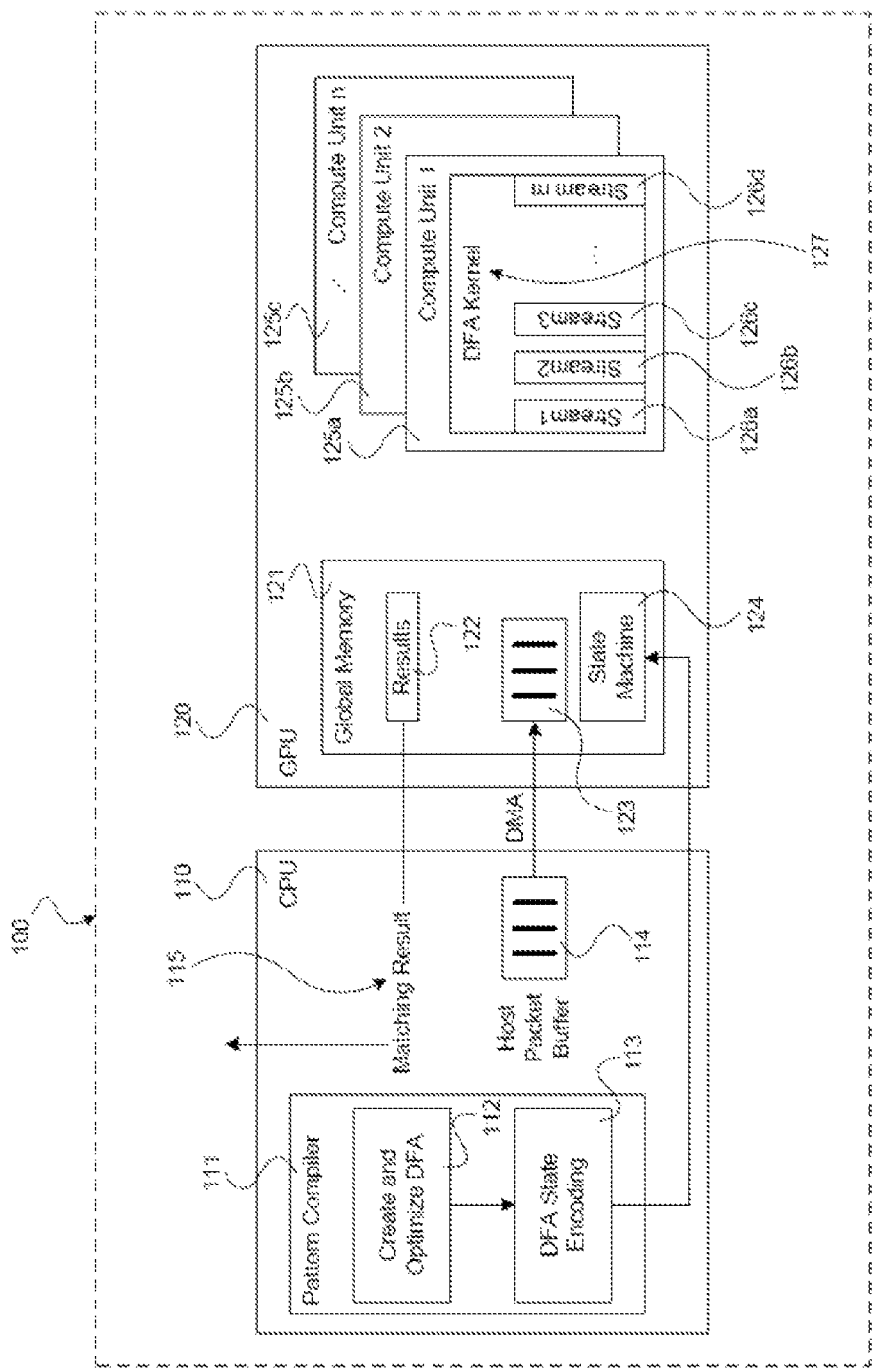
FIG. 1 illustrates a multi-core and many-core processor system including a CPU and a GPU.
Figure 2:
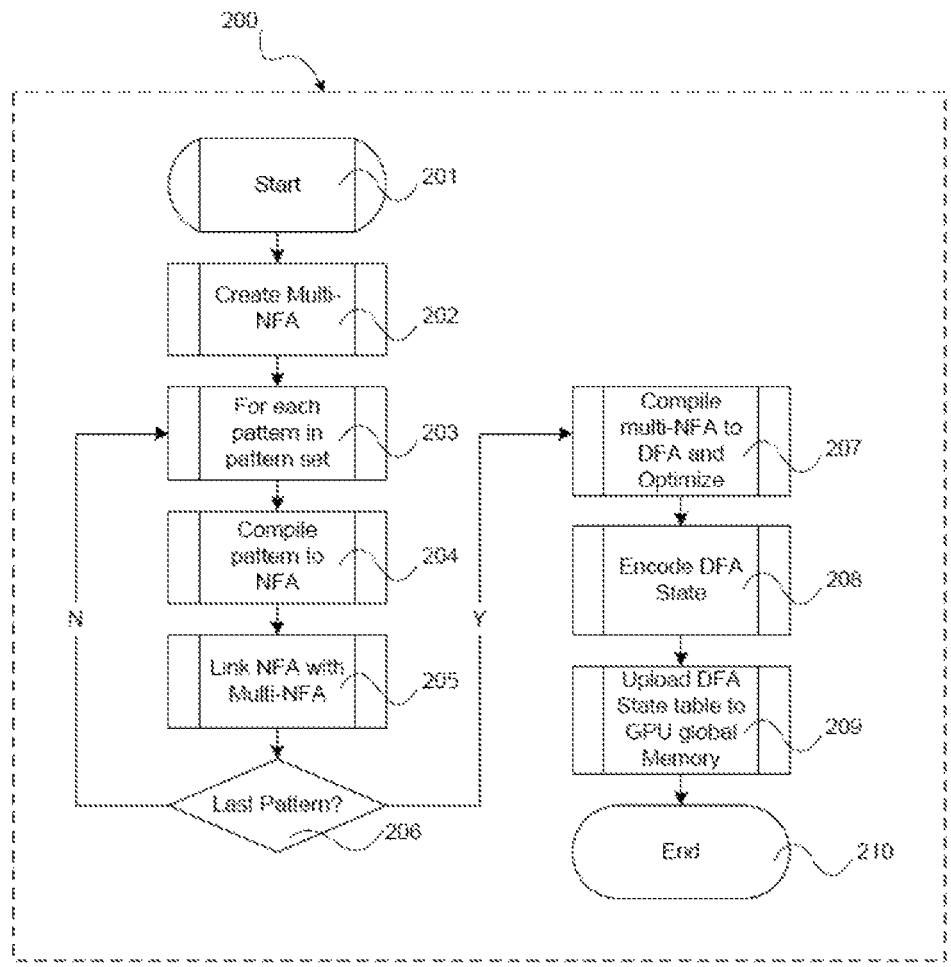
FIG. 2 illustrates a flow diagram of a compiling stage performed on the CPU of FIG. 1.
Figure 3:
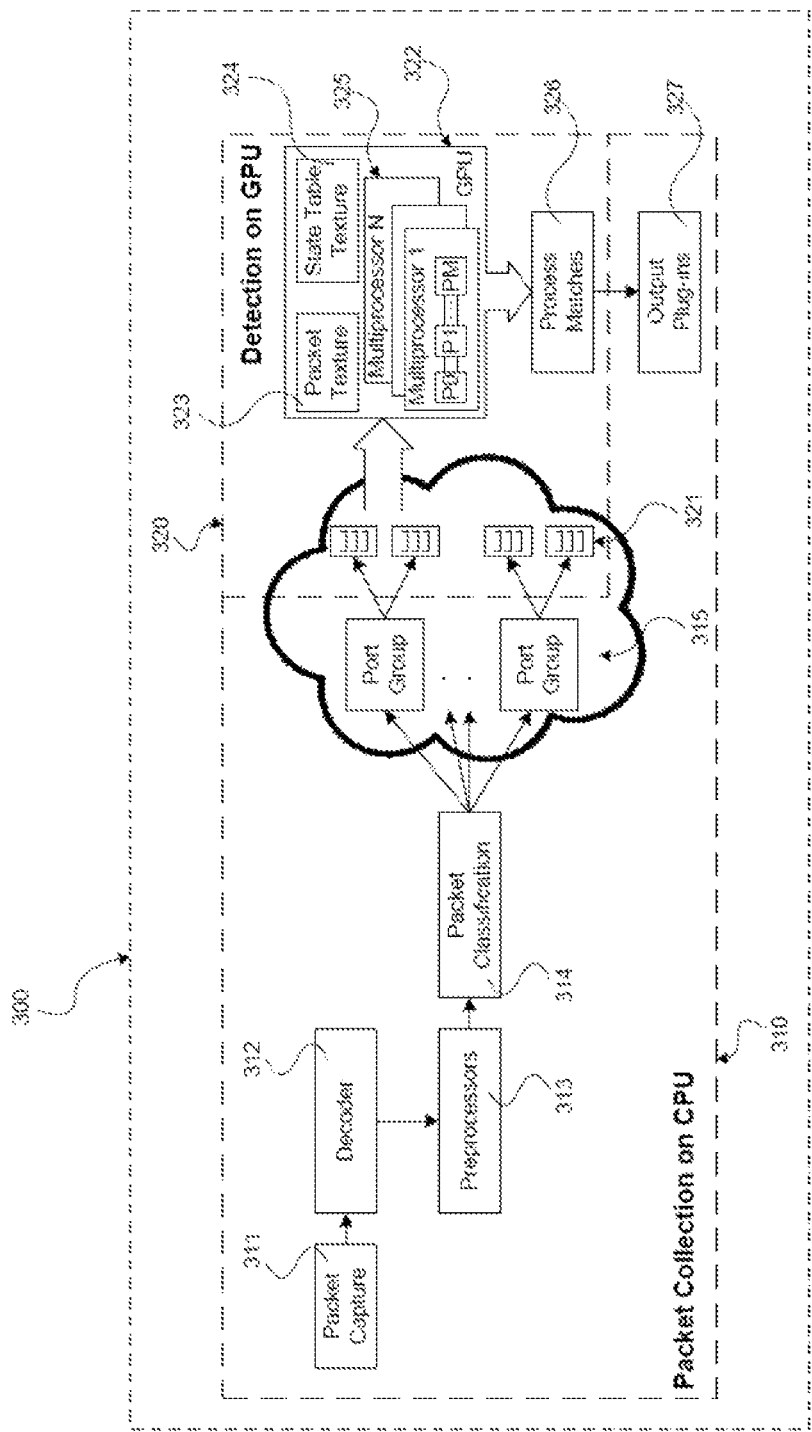
FIG. 3 shows the overall architecture of Gnort, a network intrusion detection system (NIDS)
Figure 4:
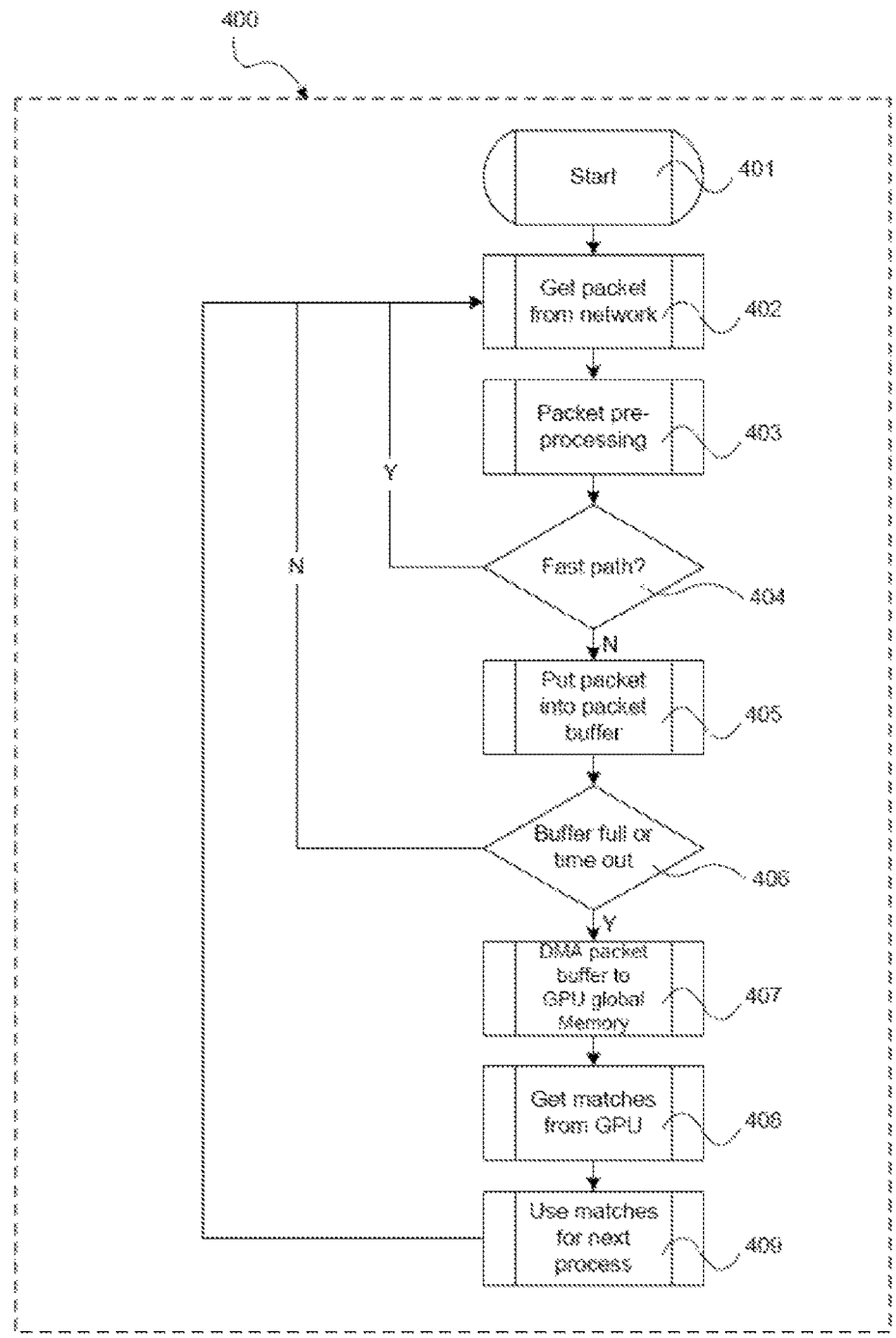
FIG. 4 illustrates the flow diagram for CPU side processing.
Figure 5:
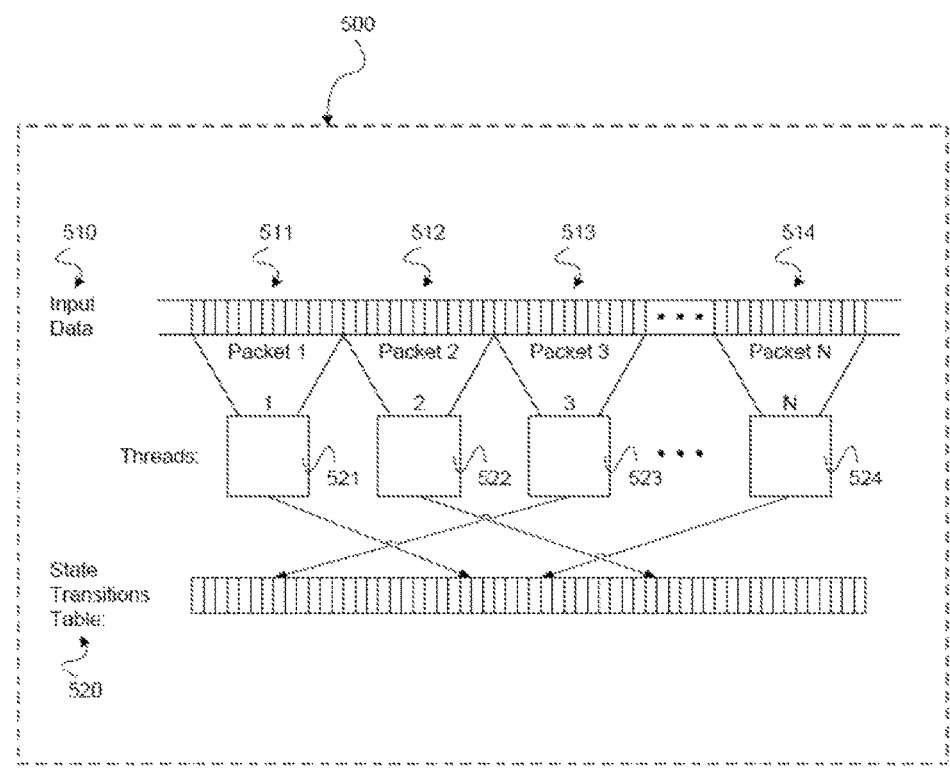
FIG. 5 illustrates a schematic diagram for GPU side processing.
Figure 6:
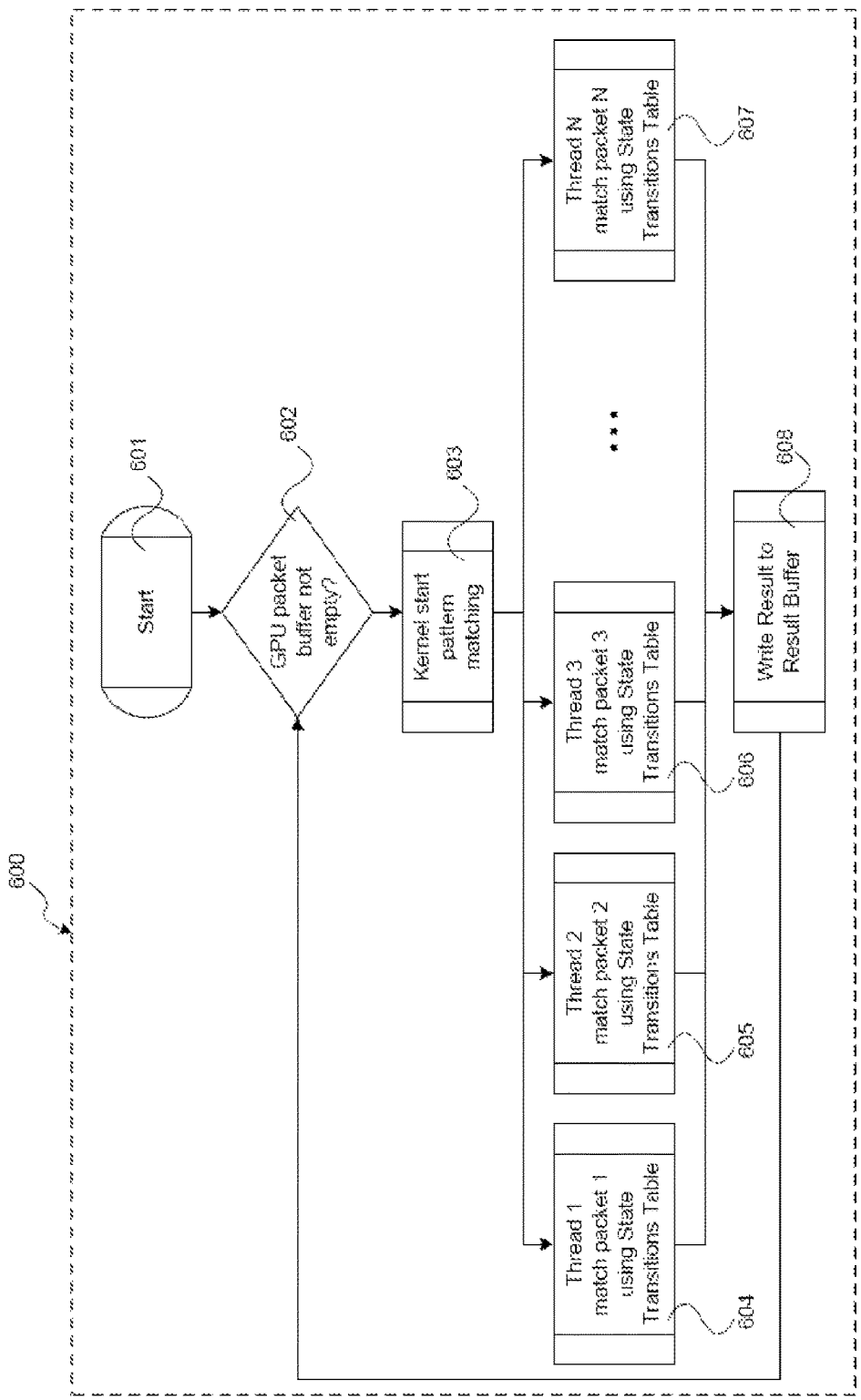
FIG. 6 illustrates a flow diagram for GPU side processing.
Figure 7:
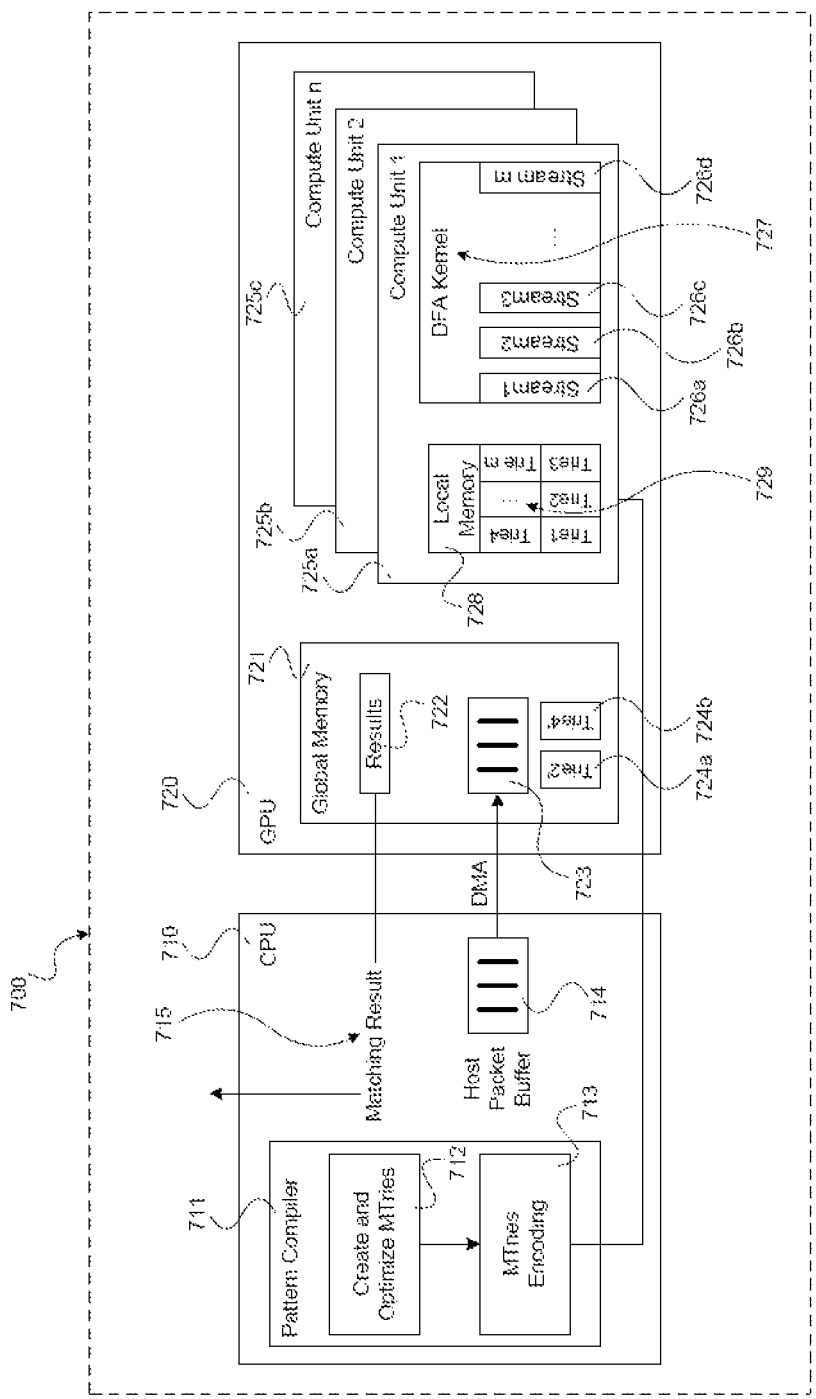
FIG. 7 shows a block diagram illustrating a processor system according to an implementation form.

FIG. 7 shows a block diagram illustrating a multi-core and many-core processor system 700 according to an implementation form. The multi-core and many-core processor system 700 may be a specific example of a general processor system or processor platform.

The processor platform 700, e.g. the multi-core and many-core processor system 700 as depicted in FIG. 7, may include a first processor 710, e.g. a CPU 710 and a second processor 720, e.g. a GPU 720. A pattern compiler 711 on the CPU 710 may include a unit for creating and optimizing MTries (multiple Tries) 712 and a unit for MTries encoding 713. The second processor, e.g. the GPU 720 may include a global memory 721 on which a memory or packet buffer 723 may be implemented that may exchange data with a host packet buffer 714 on the first processor, e.g. the CPU 710 by DMA (direct memory access). The global memory 721 may further include a results buffer 722 where matching results 715 may be accessible from the first processor, e.g. the CPU 710 for output. As an example, shown in FIG. 7, two Tries 724a, 724b are stored on the global memory 721. Any other number of Tries may be stored on the global memory 721 in other examples. The second processor, e.g. the GPU 720, may further comprise a set of computing units (also called computation units or compute units) 725a, 725b, and 725c each may include a DFA kernel 727 that may include a set of streams 726a, 726b, 726c, 726d and a local memory 728. Each of the computing units 725a, 725b, and 725c can form a dedicated core of the second processor 720. Furthermore each computing unit 725a, 725b, and 725c can be configured to perform computations independent from the other computing units 725a, 725b, 725c. As can be seen from FIG. 7, in the local memory 728 several Tries 729 can be stored (at least partly). As an example, the Trie 2 and the Trie 4 are split between the local memory 721 and the global memory 728, as the Trie 2 and the Trie 4 don't fit completely into the local memory 728. The local memories 728 of the computation units 725a, 725b, and 725c may be accessible from the first processor, e.g. the CPU 710 by the MTries encoding unit 713 of the pattern compiler 711 directly or indirectly via the GPU 720.

In other words, the processor system 700, e.g. the multi-core and many-core processor system 700, includes the first (e.g. central) processing unit 710 for compiling a plurality of patterns into a plurality of data structures (e.g. into the above mentioned Tries). Furthermore the processor system 700 comprises the second (e.g. graphics) processing unit 720 including the global memory 721, the packet buffer 723 and the plurality of computation or computing units 725a, 725b, 725c. Each of the computation units 725a, 725b, 725c includes its own dedicated local memory 728. Such local memory 728 differs from the global memory 721 in that typically only the computation unit 725a, 725b, 725c including such local memory 728 has access to its dedicated local memory 728 (and not the other computation units 725a, 725b, 725c) while to the global memory 721 all of the computation units 725a, 725b, 725c have access.

The compiling (and therefore the first processor 710 on which the compiling may be performed) is performed such that at least (or preferably) head data parts of the plurality of data structures fit into the local memories 728 of the computation units 725a, 725b, 725c of the second (e.g. graphics) processing unit 720. The first (e.g. central) processing unit 710 may be configured to upload the plurality of data structures into the second (e.g. graphics) processing unit 720 such that at least the head data parts of the plurality of data structures (e.g. Tries) 729 are uploaded into the local memories 728 of the computation units 725a, 725b, 725c of the second (e.g. graphics) processing unit 720 and remaining data parts 724a, 724b of the plurality of data structures not fitting into the local memories 728 are uploaded into the global memory 721 of the second (e.g. graphics) processing unit 720. In the example shown in FIG. 7, the Tries 2 and 4 don't fit into the local memory 728 of a computing unit 725a, 725b, 725c, therefore only the head data parts of Tries 2 and 4 are loaded into the local memory of the first computing unit 725a, while the remaining data parts 724a, 724b of the Tries 2 and 4 are loaded into the global memory 721.

The second (e.g. graphics) processing unit 720 may receive one or more packets from the first (e.g. central) processing unit 710 in the packet buffer 723 and may execute multiple pattern matching with respect to the received packet by using a plurality of threads running (independently from each other, e.g. without any data exchange between them) on the computation units 725a, 725b, 725c of the second (e.g. graphics) processing unit 720. Each thread may process a portion of the received packet according to information comprised in the data structures uploaded into the second (e.g. graphics) processing unit 720. As an example, the threads may perform a regex pattern matching on the packet or at least on certain parts of the packet. The part of the packet which is analyzed by each thread can be determined by the information in the data structures (e.g. the Tries).

The compiling may provide a instead of a complete (big) state machine data structure (e.g. a DFA state machine, e.g. for regex pattern matching) comprising all patterns to be searched in a packet many small data structures (e.g. Tries), wherein each data structure corresponds to one or more patterns to be searched in the same portion of the packet. In other words, a thread running on a computation unit may search for different patterns inside the packet, but which have to be searched in the same portion of the packet (e.g. which have the same pattern offset indicated in the data structure according to which the thread performs the pattern matching). Hence, different threads may search for the same patterns but on different portions of the same packet.

Although in FIG. 7 a Trie data structure is described for being used by that algorithm, other implementations may use different data structures for that algorithm.

In the compiling stage or pattern compiler 711 all regex patterns to be matched may be compiled to derive the plurality of data structures e.g. in as M Tries. Each data structure indicates one or more patterns to be found in the packet and indicates a portion of the packet to be searched for such patterns. Each Trie may be put into the local memory 728 of a specific computation unit 725a, 725b, 725c of the second (e.g. Graphics) processing unit 720. The following exemplary guidelines may be used for putting M Tries into the local memory 728 of the second (e.g. Graphics) processing unit:

One Trie can be and only be put into one computation unit 725a, 725b, 725c.

All Tries shall be put into Local Memory 728.

If one Trie cannot be put into local memory 728 together with others, put the head part of the Trie, i.e. the cache efficient part into the local memory 728 and put the left part into global memory 721.

Figure 8:
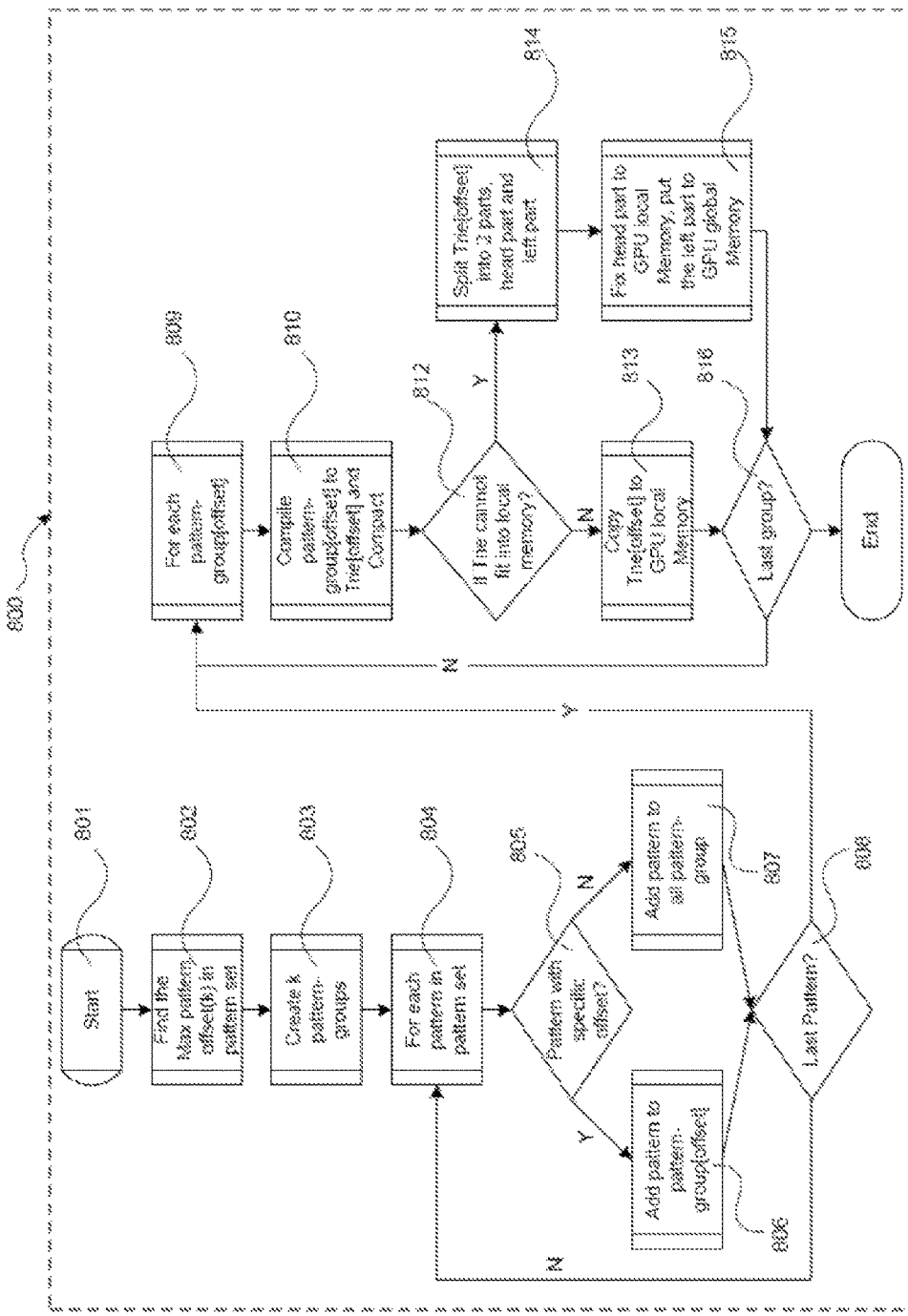
FIG. 8 shows in a flow diagram the compiling of patterns into data structures and the distributing of the data structures to memories of a second processing unit shown in the processor system of FIG. 7 according to an implementation form.

FIG. 8 shows in a flow diagram 800 how the patterns to be searched are compiled into the data structures and how the data structures are distributed to the local memories 728 of the computation units 725a-725c and the global memory 721 of the second processing unit 720.

The steps 801 to 810 of the flow diagram 800 in FIG. 8 show how the first processing unit 710 of the processor system 700 compiles the patterns to be matched into the (state machine) data structures (the M Tries).

After starting the compiling process (step 801), a maximum pattern offset is searched 802 in a pattern set as a function of integer k using a second computing block. Then k pattern groups are created 803. For each pattern (block 804) in the pattern set the pattern is checked 805 if it has a specific pattern offset or if no pattern offset is associated with the pattern. If the pattern has a specific offset associated with it, the pattern is added 806 to a pattern group (pattern-group[offset]) associated with the offset of the pattern. Otherwise (if the pattern does not have any specific pattern offset associated with it) the pattern is added 807 to all created pattern groups. This checking for the specific offset is repeated 808 until the last pattern has been processed and is added to a certain pattern group.

Then, each created pattern group (block 809) is compiled 810 to a data structure (e.g. Trie[offset]) associated with the offset of the created pattern group] and compacted. A detailed implementation of the steps performed in the steps and blocks 801 to 810 is described in the parallel PCT application having the title "Method and apparatus for generating a plurality of indexed data fields" of the same applicant.

Furthermore, the steps and blocks 812 to 817 show how the different compiled data structures are distributed to the memories 721, 728 of the second processing units 720.

Afterwards compiling a data structure (a Trie) it is checked (812) if the compiled the data structure fits into the local memory 728 of a computation unit 725a, 725b. 725c of the second processing unit 720.

If the data structure (e.g. Trie[offset], such as Trie 2 and Trie 4 in FIG. 7) does not fit completely into such local memory 728, the data structure is split (814) into two parts—a head part and a remaining part. The (cache efficient) head part is put (815) into the local memory 728 of the second (e.g. Graphics) processing unit 720 and the remaining part is put (815) into the global memory 721 of the second (e.g. Graphics) processing unit 720.

If the complete data structure (e.g. the complete Trie [offset], such as Trie 1 and Trie 3 in FIG. 7) fits into the local memory 728 of a computation unit 725a, 725b, 725c of the second processing unit 720, the complete data structure is copied into the local memory 728 of the computation unit 725a, 725b, 725c.

The compiling of the pattern groups in the data structures and the uploading of the compiled data structures to the memories of the second processing unit 720 is repeated (816) until the last pattern group is compiled and uploaded to a memory of the second processing unit 720.

Compiling a plurality of patterns into a plurality of data structures using the first processing unit 710 of the processor platform 700 may thus be performed by the computing blocks or steps 801, 802, 803, 804, 805, 806, 807, 808, 809, 810. In these steps the plurality of pattern are compiled s such that at least head data parts of the plurality of data structures fit into the local memories 728 of the computation units 725a, 725b, 725c of the second processing unit 720 of the processor platform 700 as described above with respect to FIG. 7. The Uploading of the plurality of data structures into the second processing unit 720 such that at least the head data parts of the plurality of data structures are uploaded into the local memories 728 of the computation units 725a, 725b, 725c of the second processing unit 720 and remaining data parts of the plurality of data structures not fitting into the local memories are uploaded into a global memory 721 of the second processing unit 720 is performed by in the steps 812 to 815.

Figure 9:
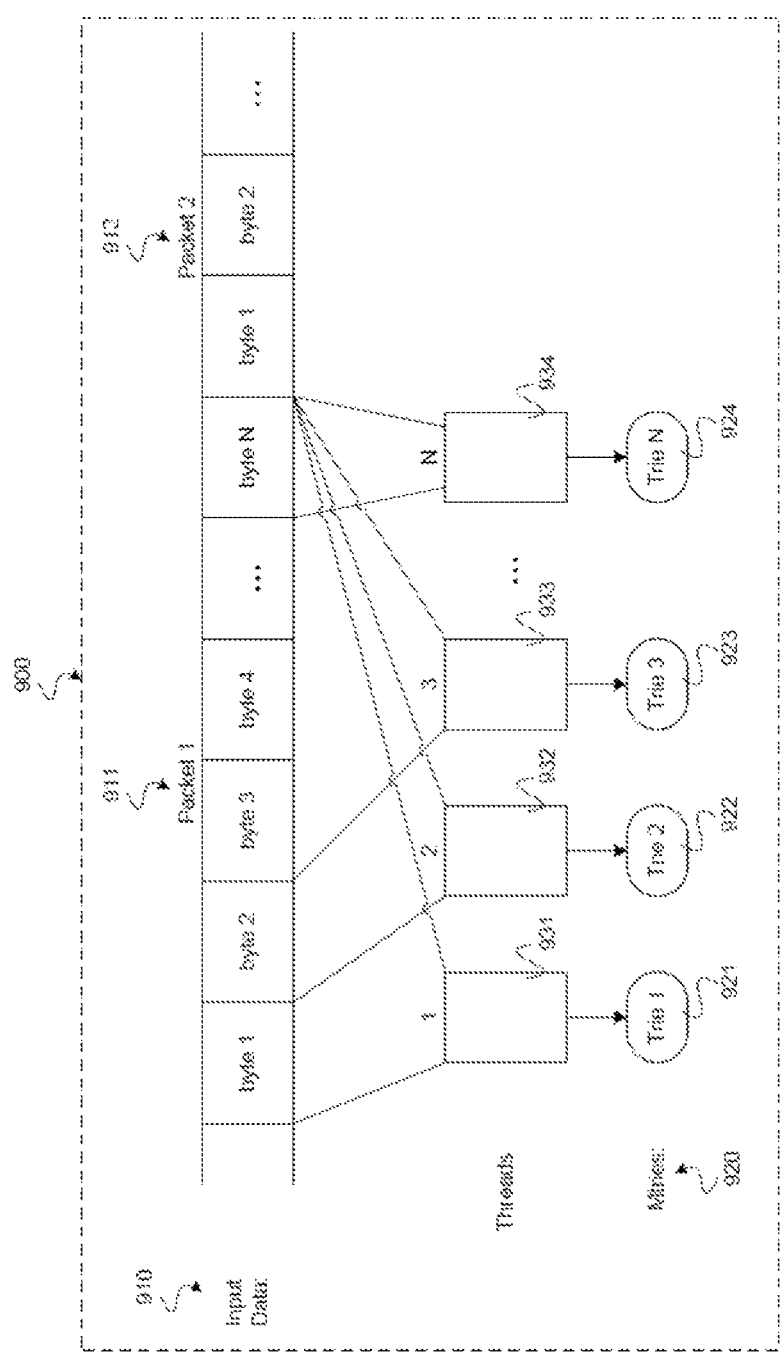
FIG. 9 shows a schematic diagram illustrating a pattern matching process performed on the second processing unit shown in the processor system of FIG. 7 according to an implementation form.

FIG. 9 shows a schematic diagram 900 illustrating the pattern matching process performed on the second processing unit 720, e.g. on GPU side. In this example, input data 910 includes a first packet 911 having bytes 1 to N and a second packet 912 having bytes 1, 2, etc. Furthermore, a plurality of threads 931 to 934 are illustrated which perform pattern matching on portions of the first packet 911. Each of the threads 931 to 934 runs independently from the other threads on one of the computation units 725a, 725b, and 725c of the second processing unit 720. As mentioned, all threads 931, 932, 933, 934 may search against one and the same first packet 911 per time. Each thread accesses a specific data structure or Trie 921, 922, 923, 924 only and may search in a specific part or portion of the first packet 911 that may be indicated by the Trie or an information in the Trie, such as a pattern offset. Each Trie 921, 922, 923, 924 represents a (state machine) data structure into which the patterns received by the first processing unit (e.g. the CPU) 710 as described above with respect to FIG. 7 were compiled to, e.g. according to the compilation process as described above with respect to FIG. 8.

For example, a first thread 931 may access a first Trie 921 that may indicate searching bytes 1 to N of the first packet 911; a second thread 932 may access a second Trie 922 that may indicate searching bytes 2 to N of the first packet 911; a third thread 933 may access a third Trie 923 that may indicate searching bytes 3 to N of the first packet 911 and an N-th thread 934 may access an N-th Trie 924 that may indicate searching byte N of the first packet 911.

In one implementation, the whole set of Threads 931, 932, 933, 934 may be utilized without a connection to the number of packets 911, 912 available in the buffer. For an example where the packets 911, 912 are of small size, not all Threads 931, 932, 933, 934 may be required to process a single packet. In one example, the first Thread 931 may process the first packet 911, the second Thread 932 may process the second packet 912, the third Thread may process a third packet (not depicted in FIG. 9) and the N-th thread 934 may process an N-th packet (not depicted in FIG. 9). In another example, the first and the second Threads 931, 932 may process the first packet 911, and the third Thread 933 may process the second packet. In one example, the first, second, third and N-th Threads 931, 932, 933, 934 may flexibly process incoming packets, e.g. depending on a packet length and/or a system load.

In one example, an assignment between Thread and packet or packet byte to be processed by the Thread may not be required to be specified in advance; instead it may be flexibly assigned. A Thread to packet assignment may be utilized to provide an assignment of which Thread is processing which packet and/or which packet byte. That assignment may be performed online depending on the types of packets received and depending on the load to be processed. The number of effective Threads may be adapted to the requirements and/or the current load situation. For example, in situations when few packets are processed per GPU kernel, and/or the number of effective Threads may be even higher than the number of available packets, the whole set of Threads may be utilized without connection to the number of packets available in the buffer in order to avoid an under-utilized platform. A real differentiator which may flexibly handle Thread processing, e.g. differentiated by packet type and/or platform load, may improve GPU efficiency by parallelizing the matching. The Thread-per-packet and Thread-per-Offset solutions may hence be transformed in a high flexible and effective real-differentiator solution, which is improving GPU efficiency by parallelizing matching.

Figure 10:
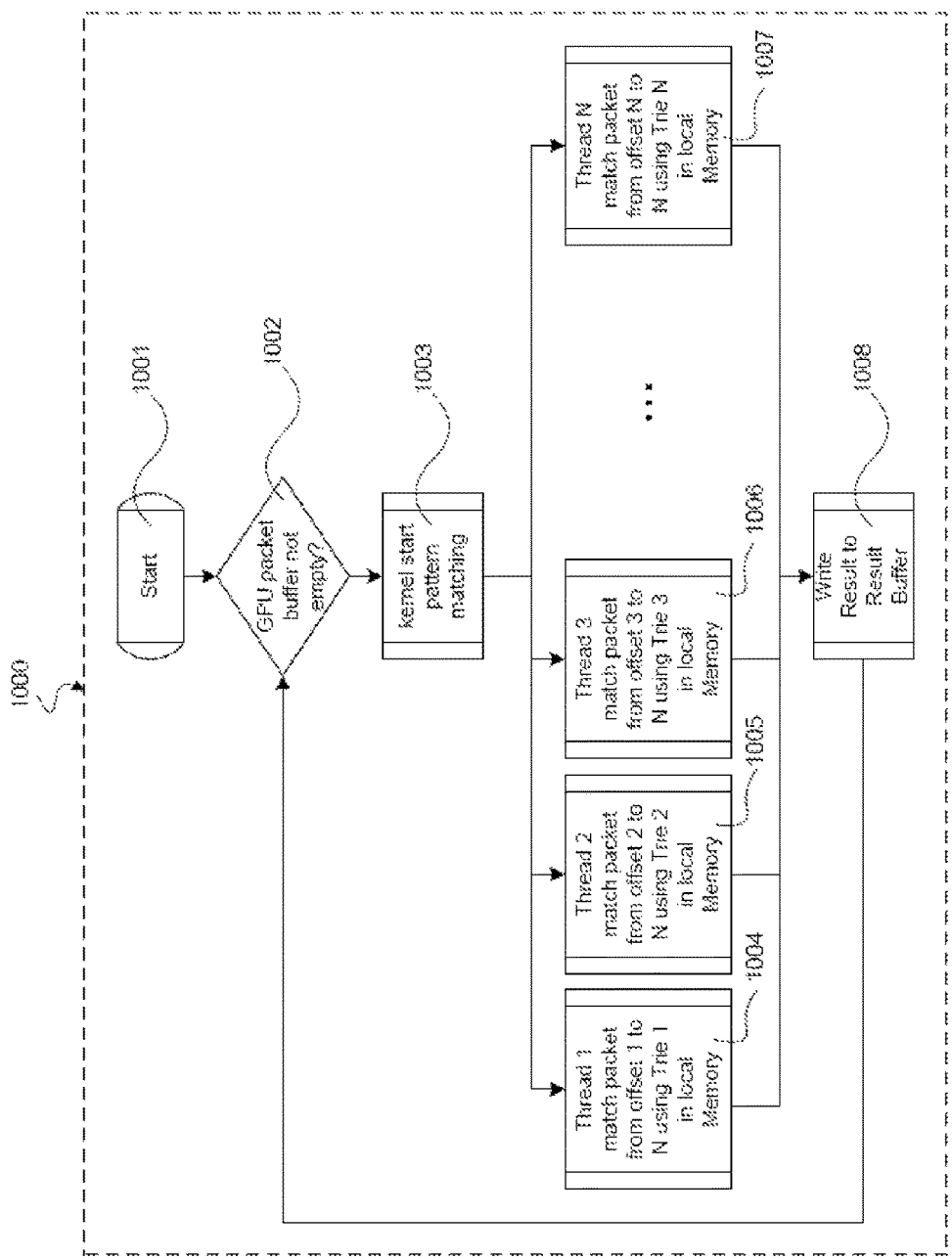
FIG. 10 shows a flow diagram of the pattern matching process of FIG. 9 according to an implementation form.

FIG. 10 shows a flow diagram 1000 illustrating the pattern matching performed by the second processing unit 720 according to an implementation form.

After start 1001 the packet buffer 723 of the second processing unit, e.g. a GPU packet buffer 723 is checked (1002). If the buffer is not empty, the kernel starts (1003) the pattern matching. Now the several computation units 725a to 725c perform (1004 to 1007) pattern matching according to the respective data structure uploaded on their local memories 728 on the portions of the packet in indicated in the respective data structure. In the example shown, N (wherein N is an integer ≥1) threads match respective pattern to a packet from offset 1 to N by using respective Tries in the local memories 728 of the computation units 725a to 725c on which the Threads are running. In particular, thread 1 may match the packet from (byte) offset 1 to N by using Trie 1 in a local memory 728 of a first computation unit; thread 2 may match the packet from offset 2 to N by using Trie 2 in a local memory 728 of a second computation unit; thread 3 may match the packet from offset 3 to N by using Trie 3 in a local memory 728 of a third computation unit and thread N may match the packet from offset N to N by using Trie N in a local memory 728 of an n-th computation unit. The results of the matching threads are written 1008 to the result buffer 722 of the second processing unit 720.

The offsets and last bytes to be processed by each Thread are indicated by information compiled in the Tries 1 to N according to which the Threads perform the pattern matching.

The local memory may represent one of the local memories 728 of the computation units 725a, 725b, 725c of the second processing unit 720, e.g. a GPU, of the processor platform 700 described above with respect to FIG. 7.

Each of the Tries (Trie 1 to Trie N) was generated by compiling patterns into data structures as described in the compilation process of FIG. 8. In this example shown in FIGS. 8 to 10, each data structure comprises a Trie structure. However, according to further implementation forms the patterns can also be compiled into data structures comprising other (state machine) structures. Furthermore, each of the data structures (Tries) may comprise several patterns to be searched in the same portion or part of the packet. Different data structures relate to different portions of the packet. Therefore during the pattern matching, the plurality of Threads accesses the same packet but different portions of the packet. Furthermore, the portions of the packet accessed by the different Threads may overlap.

When applying the real-differentiator solution as described above with respect to FIG. 9, the Threads 1004, 1005, 1006 and 1007 may match respective packets or packet bytes/offsets as assigned by a Thread-to-packet assigner (not depicted in FIG. 10). Such a Thread-to-packet assigner may flexibly assign which packet or packet byte/offset is processed by which Thread and may hence increase parallelizing matching and thus increase processing speed of the GPU side processing.

Figure 11:
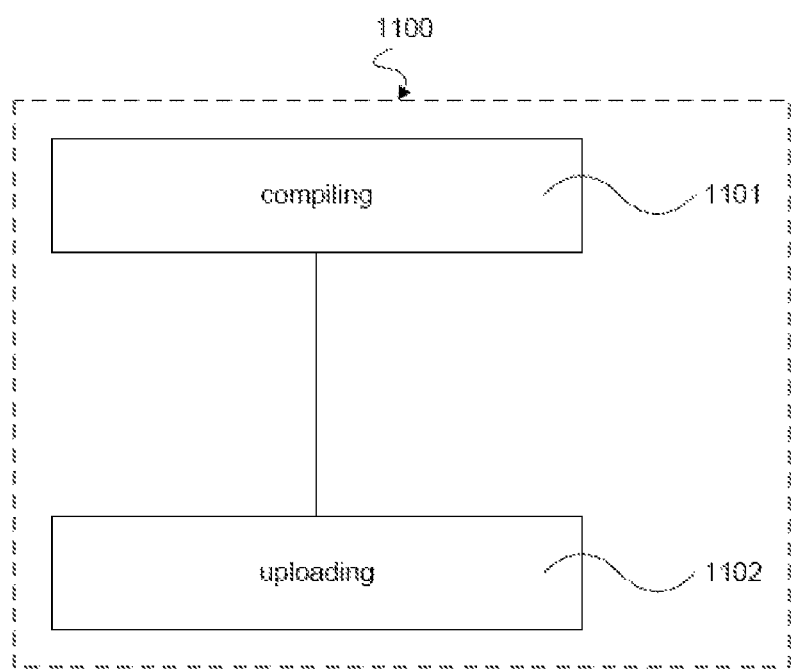
FIG. 11 shows a block diagram illustrating a method for pattern processing on a processor platform according to an implementation form.

FIG. 11 shows a block diagram illustrating a method 1100 for pattern processing on a processor platform, e.g. a multi-core and many-core processor platform, according to an implementation form. The processor platform may include a first (e.g. central) processing unit and a second (e.g. graphics) processing unit. The second (e.g. graphics) processing unit may include a global memory, a packet buffer and a plurality of computation units, each computation unit may include a local memory. The method 1100 may include compiling 1101 a plurality of patterns into a plurality of data structures using the first (e.g. central) processing unit. The compiling may be such that at least or preferably head data parts of the plurality of data structures fit into the local memories of the computation units of the second (e.g. graphics) processing unit. The method 1100 may include uploading 1103 the plurality of data structures into the second (e.g. graphics) processing unit such that at least or preferably the head data parts of the plurality of data structures are upload into the local memories of the computation units of the second (e.g. graphics) processing unit and remaining data parts of the plurality of data structures not fitting into the local memories are uploaded into the global memory of the second (e.g. graphics) processing unit.

In one example, the compiling may be performed such that the full data structures fit into the local memories of the computation units of the second (e.g. graphics) processing unit and the uploading may upload the full data structures into the local memories of the computation units of the second (e.g. graphics) processing unit. In one example, the compiling may be performed such that the head data part of each data structure fits into a local memory of a corresponding computation unit of the second (e.g. graphics) processing unit and the uploading may upload at least or preferably the head data part of each data structure into the local memory of the corresponding computation unit of the second (e.g. graphics) processing unit. In one example, the uploading may be such that each data structure is uploaded only into one of the computation units of the second (e.g. graphics) processing unit. In one example, the plurality of patterns may include regex patterns. In one example, the compiling is performed such that each data structure comprises a Trie data structure. In one example, the compiling is performed such that each data structure comprises a Deterministic Finite Automation state table. In one example, the method may include receiving a packet in the packet buffer of the second (e.g. graphics) processing unit; executing multiple pattern matching with respect to the received packet by using a plurality of threads running on the computation units of the second (e.g. graphics) processing unit. Each thread may process at least a portion of the received packet according to information comprised in the data structure uploaded at last partially into the local memory of the computation unit on which the thread is running. In one example, the information which portion of the received packet is processed by a particular thread may be included in the data structure uploaded at least partially into the local memory of computation unit on which the particular thread is running. In one example, all of the threads may execute in each processing instant the multiple pattern matching with respect to one received packet. In one example, the information comprised in the data structures which portion of the received packet is processed by a particular thread indicates a first byte of the received packet to be processed by this partical process. In one example, the first byte indicated in the information may be different for each data structure and may indicate an increasing byte of the received packet. In one example, the information further indicates a last byte of the received packet to be processed by a particular thread. The last byte indicated in the information may be equal for all of the sub data structures.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

The present disclosure also supports a computer program product including computer executable code or computer executable instructions that, when executed, causes at least one computer to execute the performing and computing steps described herein, in particular the method 1100 as described above with respect to FIG. 11 and the techniques described above with respect to FIGS. 7-10. Such a computer program product may include a readable storage medium storing program code thereon for use by a processor system, e.g. a multi-core and many-core processor system, comprising a first (e.g. central) processing unit and a second (e.g. graphics) processing unit, the second (e.g. graphics) processing unit comprising a global memory, a packet buffer and a plurality of computation units, each computation unit comprising a local memory, the program code comprising: instructions for the first (e.g. central) processing unit to compile a plurality of patterns into a plurality of data structures, wherein the compiling is such that at least or preferably head data parts of the plurality of data structures fit into the local memories of the computation units of the second (e.g. graphics) processing unit; and instructions for the first (e.g. central) processing unit to upload the plurality of data structures into the second (e.g. graphics) processing unit such that at least or preferably the head data parts of the plurality of data structures are uploaded into the local memories of the computation units of the second (e.g. graphics) processing unit and remaining data parts of the plurality of data structures not fitting into the local memories are upload into the global memory of the second (e.g. graphics) processing unit.

Aspects of the invention as presented above describe a CPU and GPU heterogeneous environment. Other aspects of the invention relate to different heterogeneous environment like CPU and FPGA, SNP and FPGA. In one of such environments, the first processing unit 710 as described above with respect to FIG. 7 may represent the CPU and the second processing unit 720 as described above with respect to FIG. 7 may represent the FPGA. In another one of such environments, the first processing unit 710 as described above with respect to FIG. 7 may represent the SNP and the second processing unit 720 as described above with respect to FIG. 7 may represent the FPGA.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A method for processing a payload of a packet on a multi-core or many-core processor platform, the method comprising:
   identifying, by a first processor of the processor platform, a plurality of patterns in the payload;
   compiling, by the first processor, each of the plurality of patterns into a data structure, thereby forming a plurality of data structures such that at least a head part of each of the plurality of data structures fits into local memories of computation units of a second processing unit of the processor platform;
   uploading, by the first processor, at least the head parts of the plurality of data structures
   into the local memories of the computation units of the second processing unit; and uploading, by the first processor, remaining parts of the plurality of data structures not fitting into the local memories into a global memory of the second processing unit.

2. The method of claim 1, wherein the first processing unit comprises a central processing unit and the second processing unit comprises a graphics processing unit.

3. The method of claim 1, wherein the plurality of patterns comprise regex patterns.

4. The method of claim 1, wherein the compiling is performed such that each data structure comprises a Trie data structure.

5. The method of claim 1 further comprising:
receiving a packet into a buffer of the second processing unit;
executing multiple pattern matching with respect to the received packet by using a plurality of threads running on the computation units of the second processing unit, wherein each thread processes at least a portion of the received packet according to a data structure uploaded at least partially into the local memory of the computation unit on which the thread is running.

6. The method of claim 5, wherein the threads running on the different computation units execute the multiple pattern matching with respect to the same received packet.

7. The method of claim 5, wherein each data structure comprises information indicating a first byte of the received packet to be processed by a particular thread.

8. The method of claim 7, wherein the first byte indicated in the information is different for each data structure and indicates an increasing byte of the received packet.

9. The method of claim 5, wherein each data structure comprises information indicating a last byte of the received packet to be processed by a particular thread.

10. A multi-core processor system comprising first and second processing units on a shared processor platform, the processor system comprising:
the first processing unit configured to
identifying a plurality of patterns in a payload and compiling each of the plurality of patterns into a data structure, thereby forming a plurality of data structures such that at least a head part of each of the plurality of data structures fits into local memories of computation units of the second processing unit of the processor platform;
upload at parts of the plurality of data structures into the local memories of the computation units of the second processing unit; and
upload remaining parts of the plurality of data structures not fitting into the local memories into a global memory shared by the first and second processing units.

11. The processor system of claim 10, wherein the first processing unit comprises a central processing unit and the second processing unit comprises a graphics processing unit.

12. A non-transitory, storage medium comprising a computer program with a program code for execution by a first processor on a multi-core processor platform, the program code including instructions for processing a payload of a packet, the instructions including:
instructions for identifying a plurality of patterns in the payload;
instructions for compiling each of the plurality of patterns into a data structure, thereby forming a plurality of data structures such that at least a head part of each of the plurality of data structures fits into local memories of computation units of a second processing unit of a processor platform shared with the first processor;
uploading at least the head parts of the plurality of data structures into the local memories; and
uploading remaining parts of the plurality of data structures not fitting into the local memories into a global memory of the processor platform.

13. The non-transitory, computer readable medium of claim 12, wherein the first processing unit comprises a central processing unit and the second processing unit comprises a graphics processing unit.

14. The non-transitory, computer readable medium of claim 12, wherein the plurality of patterns comprise regex patterns.

15. The non-transitory, computer readable medium of claim 12, wherein the compiling is performed such that each data structure comprises a Trie data structure.

16. The non-transitory, computer readable medium of claim 12, wherein each data structure comprises information indicating a first byte of a packet received by the second processing unit to be processed by a particular thread executing at the second processing unit.

17. The non-transitory, computer readable medium of claim 16, wherein the first byte is different for each data structure and indicates an increasing byte of the received packet.

18. The non-transitory, computer readable medium of claim 12, wherein each data structure comprises information indicating a last byte of a data packet received by the second processing unit to be processed by a particular thread executing at the second processing unit.

* * * * *